(12) United States Patent
Roberts et al.

(10) Patent No.: US 7,874,411 B2
(45) Date of Patent: Jan. 25, 2011

(54) REEL FOR MAINTAINING FIBER OPTIC CABLE ASSEMBLIES

(75) Inventors: Reginald Roberts, Taylorsville, NC (US); Joseph C. Jensen, Lawndale, NC (US); Gerry J. Harvey, Newton, NC (US)

(73) Assignee: Corning Cable Systems LLC, Hickory, NC (US)

( * ) Notice: Subject to any disclaimer, the term of this patent is extended or adjusted under 35 U.S.C. 154(b) by 573 days.

(21) Appl. No.: 11/584,938

(22) Filed: Oct. 23, 2006

(65) Prior Publication Data

US 2008/0093187 A1 Apr. 24, 2008

(51) Int. Cl.
*B65H 75/00* (2006.01)

(52) U.S. Cl. .................... 191/12.2 R; 191/12.4

(58) Field of Classification Search .......... 242/407.1, 242/370, 396, 398; 191/12.2 R, 12.4, 12.2 A
See application file for complete search history.

(56) References Cited

U.S. PATENT DOCUMENTS

| | | | | |
|---|---|---|---|---|
| 1,558,345 A * | 10/1925 | De Lin | | 72/343 |
| 2,205,056 A * | 6/1940 | Atkins | | 200/561 |
| 2,501,596 A | 3/1950 | Denny | | |
| 3,059,763 A | 10/1962 | Eifrid | | |
| 3,208,121 A * | 9/1965 | Price | | 242/388.1 |
| 4,657,203 A | 4/1987 | Crawford | | 242/125.1 |
| 4,667,896 A * | 5/1987 | Frey et al. | | 242/118.41 |
| 4,796,830 A | 1/1989 | Gelfman | | 242/117 |
| 4,880,182 A * | 11/1989 | Gelfman | | 242/613 |
| 4,901,939 A | 2/1990 | Obst et al. | | 242/118.4 |
| 5,335,874 A | 8/1994 | Shrum et al. | | 242/118.4 |
| 5,547,147 A * | 8/1996 | Georges | | 242/607.1 |
| 5,806,788 A | 9/1998 | Witwer et al. | | 242/608.6 |
| 5,812,728 A * | 9/1998 | Wanamaker | | 385/139 |
| 6,253,893 B1 * | 7/2001 | Chi-Min | | 191/12.4 |
| 6,669,135 B1 * | 12/2003 | Hartley | | 242/390.9 |
| 6,715,710 B1 * | 4/2004 | Russell et al. | | 242/605 |
| 6,722,607 B2 * | 4/2004 | Weaver et al. | | 242/603 |
| 6,834,820 B2 * | 12/2004 | Wei | | 242/378 |
| 2003/0230667 A1 | 12/2003 | Ganster | | 242/613 |

FOREIGN PATENT DOCUMENTS

| | | |
|---|---|---|
| CA | 2047652 | 1/1995 |
| DE | 9210645 U1 | 10/1992 |
| FR | 2739460 | 4/1997 |

OTHER PUBLICATIONS

Patent Cooperation Treaty, International Search Report for International Application No. PCT/US07/022485, Apr. 10, 2008, 3 pages.

* cited by examiner

*Primary Examiner*—Mark T Le

(57) ABSTRACT

A cable assembly reel including a drum defining an exterior surface for receiving a length of wound cable and including at least one access panel therein for providing access to an interior cavity, and at least one flange removably attached to the drum defining an opening therethrough for receiving an axle. A cable reel for maintaining at least one cable of a cable assembly around the exterior surface of the reel and defining an interior cavity for maintaining attached hardware of the cable assembly separate from the at least one cable.

12 Claims, 4 Drawing Sheets

REEL FOR MAINTAINING FIBER OPTIC CABLE ASSEMBLIES

BACKGROUND OF THE INVENTION

1. Field of the Invention

The present invention relates generally to cable reels used to load, store, maintain and deploy fiber optic cable assemblies, and more particularly, to a flexible integrated cable reel operable for use with the loading, storing, shipping and deployment of fiber optic cable assemblies including at least one connection terminal attached thereto.

2. Technical Background

Pre-engineered fiber optic cable assemblies are being developed to deliver services from providers to subscribers within fiber optic networks. These cable assemblies typically include lengths of fiber optic cables, such as fiber optic distribution cables, having interconnection assemblies spliced or otherwise optically connected to mid-span access locations or tap points positioned along the cable lengths. The mid-span access locations present preterminated optical fibers of the distribution cable for interconnection with at least one optical fiber of another or tether cable to provide lateral branches off of the distribution cable. The tethers typically terminate in a connection terminal, such as a multi-port connection terminal or other interconnection assembly. The connection terminals often include receptacles for receiving drop cables, thus providing a plug-and-play optical network for providing drop cables to one or more subscribers.

Reels have been developed for storing, maintaining, shipping and deploying lengths of bare optical fibers and fiber optic cables of various types. Cables are typically wound around a drum of a cable reel and secured at one or both ends. In order to maintain the cables on the drum, flanges are typically provided about both ends of the drum and extend radially outward to prevent the cable from being removed about the ends of the drum. Conventional reels also typically include a shaft or opening positioned about the center of the reel to receive an axle to allow rotation of the reel to facilitate winding and unwinding of the cable.

While cable reels exist for winding and storing lengths of fibers and cables themselves, what is needed are reels capable of accommodating pre-engineered cable assemblies including cables and attached structures, such as connection terminals, tethered assemblies and multi-port connection terminals, among others, without damage to the attached assemblies and cables and in an efficient manner. What is further desired is a cable reel that is collapsible, durable, reusable and provides improved storage for cables and their attached assemblies.

SUMMARY OF THE INVENTION

To achieve the foregoing and other objects, and in accordance with the purposes of the invention as embodied and broadly described herein, the present invention provides various embodiments of a cable reel having an improved design such that it may readily accommodate an optical fiber cable assembly having at least one connection terminal attached thereto. As used herein, the term "connection terminal" is used to generically describe any attached structure, either by tether or fiber optic cable, that is optically interconnected with at least one optical fiber of the distribution cable including, but not limited to, a tethered assembly, multi-port terminal, splice-ready optical fibers or connectorized optical fibers. The present invention provides various embodiments of a collapsible cable reel designed to readily store and maintain optical fiber cable assemblies such that the drum portion of the assembly may house any connection terminal. The present invention further provides a cable reel that is resistant to environmental conditions such as moisture such that the cable reel may be recycled or reused. The present invention also provides a cable reel that may be disassembled and collapsed to a substantially flat configuration when not in use.

In one embodiment, the cable reel of the present invention combines the convenience of a cable reel that can be spooled on a rotating shaft with the ability to store attached items on or within the reel drum. The cable reel includes a collapsible reel drum that when assembled defines an interior cavity therein and an exterior including at least one access panel for providing access to the interior cavity. A cable assembly is wound or spooled on the drum, and the respective connection terminals as well as excess tether cable lengths are stored and maintained within the interior cavity as the cable is wound upon the reel. At least one removable flange having an about centrally located opening or shaft therein for receiving an axle to facilitate rotation is attached to opposed ends of the drum to provide a surface for maintaining the cable assembly around the drum.

The exemplary embodiments, as shown in the drawings, provide that the first and second flanges are substantially circular in shape and have outer rims equidistant from the drum to provide the reel with the convenience of the capacity to be rolled. In other exemplary embodiments, the first and second flanges are substantially square in shape and perforated/cut at defined points to allow the outside edges to fold over to create a closed cavity around the wound cable assembly. The use of the perforated edges provides the reel with a shipping cover, thereby eliminating the need to provide additional packaging.

In another embodiment, the present invention provides a cable reel for maintaining a cable assembly including at least one attached connection terminal. At least one of a drum or flange defines a slot or opening for accepting the at least one connection terminal such that the at least one connection terminal is maintained separately from the distribution cable, preferably within an interior cavity defined by the drum and at least one flange. The opening may comprise a channel having a shape capable of maintaining at least one multi-port connection terminal and its respective length of tether cable.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE PREFERRED EMBODIMENTS

The present invention will now be described more fully hereinafter with reference to the accompanying drawings in which exemplary embodiments of the invention are shown. However, this invention may be embodied in many different forms and should not be construed as limited to the embodiments set forth herein. These exemplary embodiments are provided so that this disclosure will be both thorough and complete, and will fully convey the scope of the invention to those skilled in the art. Like reference numbers refer to like elements throughout the various drawings.

In the exemplary embodiments described below, a cable reel is provided for maintaining, storing, shipping and deploying fiber optic cables and cable assemblies that include at least one connection terminal (e.g., a multi-port connection terminal) attached thereto. In the exemplary embodiments, the cable reel is comprised of a collapsible tubular drum that when assembled defines an interior cavity for receiving and maintaining the at least one connection terminal apart from the respective distribution cable. The cable reel further includes at least one flange removably attached to the drum for maintaining the cable assembly around the drum and further defining the interior cavity. When disassembled, the drum and the at least one flange may be collapsed to a substantially flat configuration, thereby creating a compact package. In the exemplary embodiments, the drum is provided with at least one access feature for providing access to the interior cavity.

The cable reel may be manufactured from a variety of materials, but is preferably manufactured from durable polymeric materials, such as plastic, such that deterioration of the reel caused by exposure to moisture, sunlight or other environmental factors is minimized and/or eliminated. The cable reel may be manufactured from recyclable materials. The cable reel may also be manufactured from other strong, lightweight material such as wood, metal, particle board or reinforced cardboard, among others. As used herein, a fiber optic cable assembly may include any type of fiber optic cable including, but not limited to, a distribution cable or a drop cable. As is known in the art, a distribution cable typically includes a greater number of optical fibers than a drop cable, such that pre-selected optical fibers of the distribution cable may be preterminated and optically connected with pre-selected optical fibers of at least one drop cable at least one mid-span access location. Attached drop cables may terminate in spice ready optical fibers, connectorized optical fibers, or connection terminals. It should be understood by those skilled in the art that the particular components of the cable reel described herein may be modified to accommodate different cable assembly types and different connection terminals. Further, as used throughout this disclosure, the terms "wound" and "spool" are used interchangeably.

Figure 1:
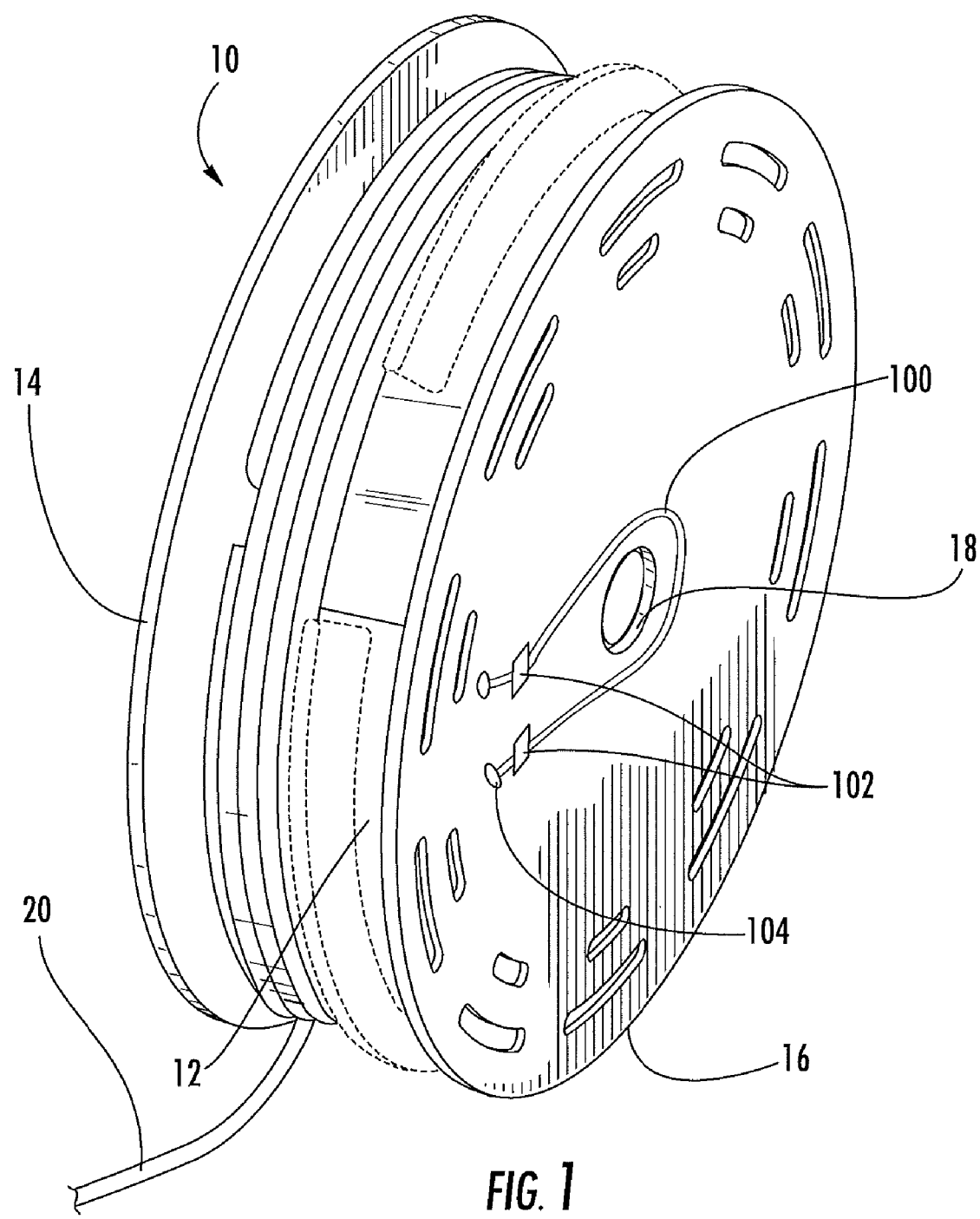
FIG. 1 is a perspective view of a cable reel for maintaining a cable assembly including at least one connection terminal in accordance with an exemplary embodiment of the present invention.
Figure 2:
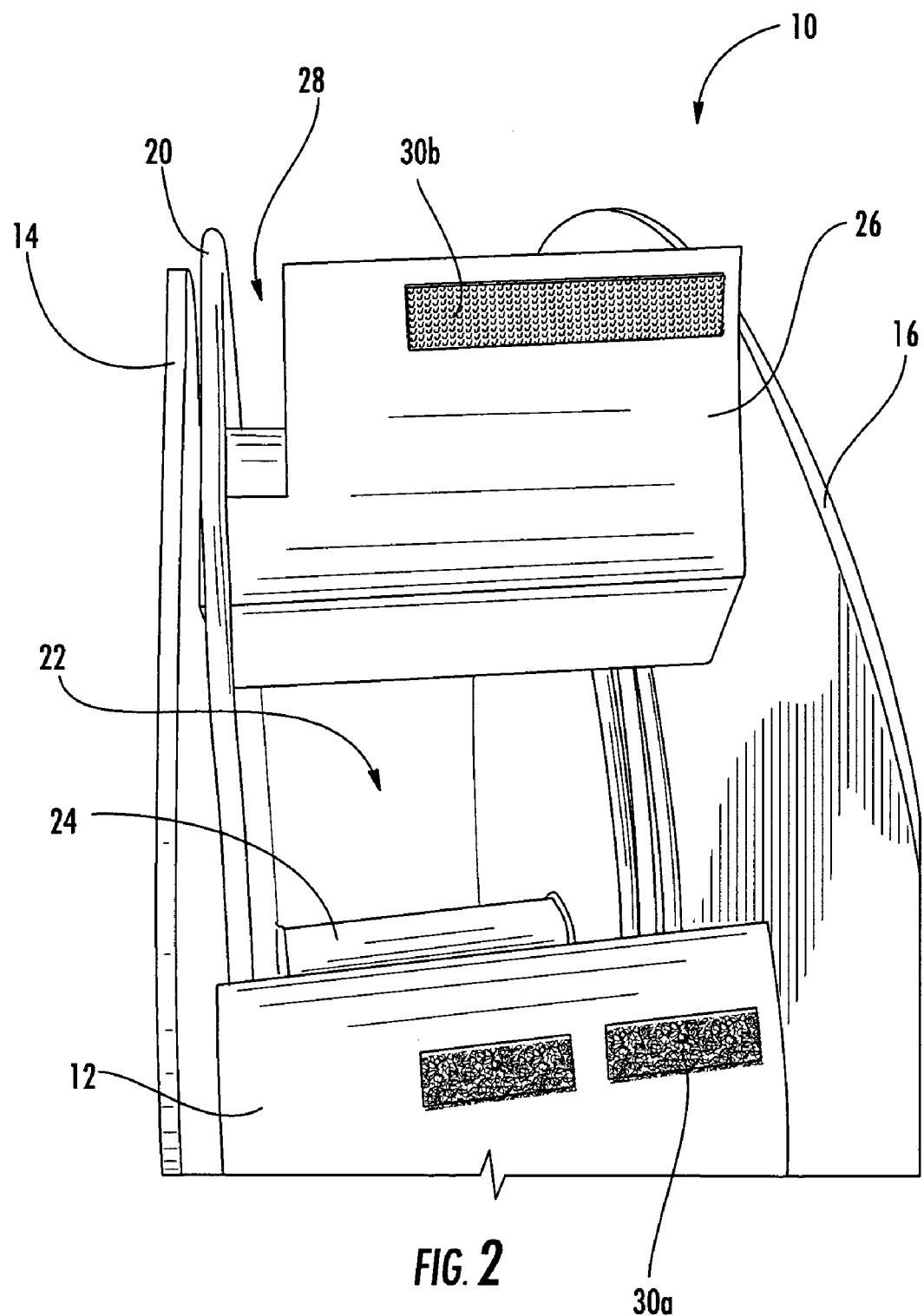
FIG. 2 is an exploded perspective view of the cable reel of FIG. 1 shown with an access panel in an opened configuration.
Figure 3:
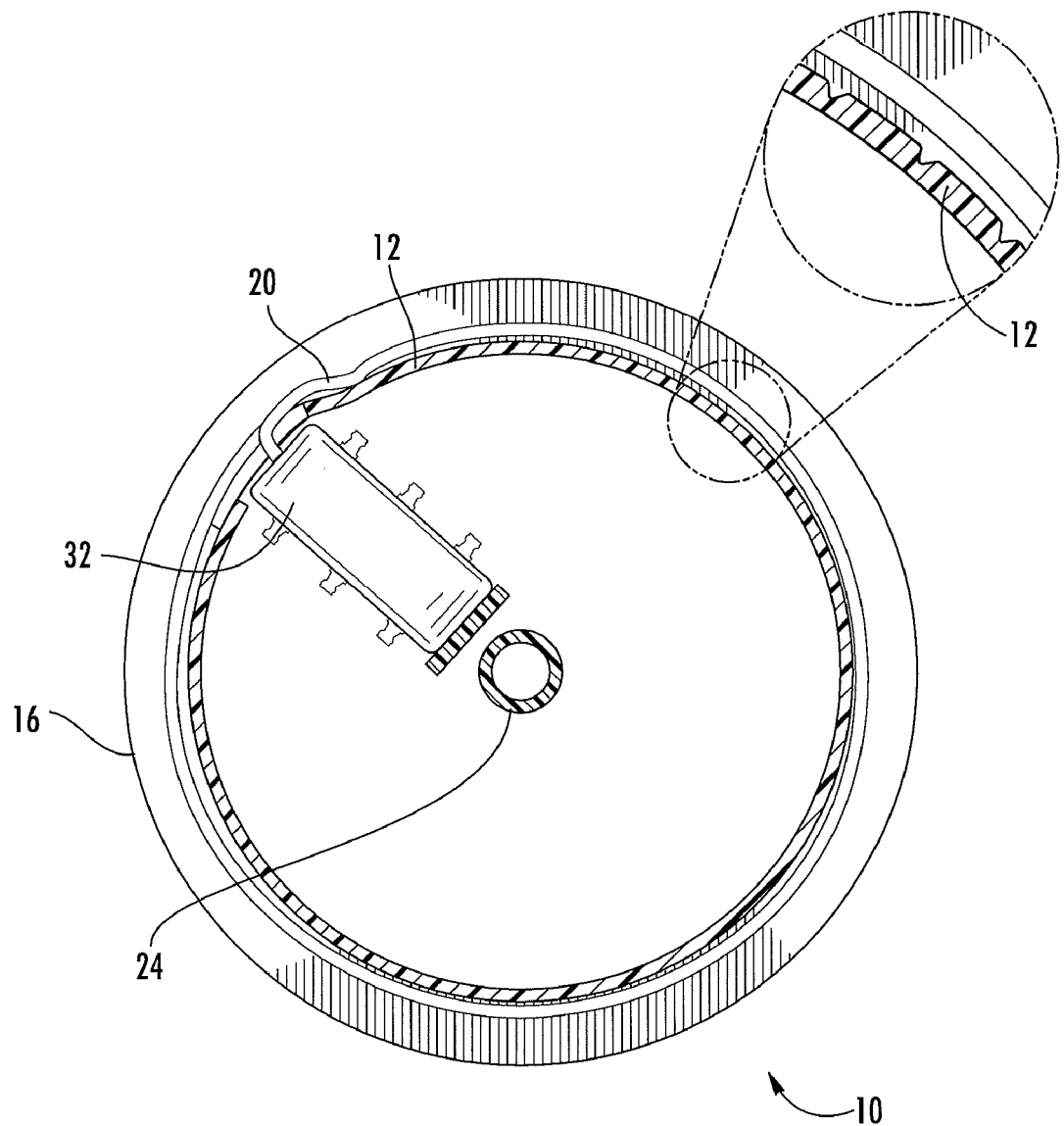
FIG. 3 is a cross-sectional view of the cable reel of FIG. 1 shown with a cable assembly wound thereon with a multi-port connection terminal housed within the interior cavity.

Referring to FIGS. 1-3, an exemplary embodiment of a cable reel 10 for maintaining, storing, shipping and deploying an optical fiber cable assembly 20 constructed in accordance with the present invention is shown. The cable reel 10 includes first and second substantially circular flanges, 14 and 16 respectively, having a collapsible reel drum 12 interposed therebetween. Flanges 14, 16 are substantially circular in shape to permit rolling and have substantially straight walls which extend radially outwardly. Flanges 14, 16 are removably attached to opposed ends of the tubular reel drum 12 using any suitable securing mechanism (not shown). The outer rims of the flanges are preferably equidistant from the drum 12 to further facilitate rolling. In other exemplary embodiments, the flanges 14, 16 may be provided with substantially conical walls having a smooth face on one side directed to a central region of the reel drum 12 for assisting in the spooling of the cable assembly 20. The securing mechanism may be a plurality of clips disposed upon the interior wall surface of the flanges 14, 16 that are operable for receiving and maintaining edges or features of the reel drum 12. Alternatively, the flanges 14, 16 may be secured to the drum 12 by tabs or screws which are passed through holes drilled in flanges 14, 16 and into the edges of the reel drum 12. When in an assembled configuration, the circular shape of the flanges 14, 16 permits the cable reel 10 to be rolled. An optional third flange may be used to divide the outer surface of the reel into discreet cable maintaining surfaces, and may be used to define the internal cavity of the reel into discreet compartments.

As best shown in FIG. 1, the flanges 14, 16 are preferably provided with a central aperture 18 or opening operable for receiving an axle or rotating shaft 24 (FIG. 2). The axle 24 may be passed through the aperture 18 of the first flange 14 into a portion of the interior cavity 22 of the drum 12 and out the opposing aperture 18 of the second flange 16. The axle 24 is operable for allowing the cable assembly 20 to be spooled or held. The flanges 14, 16 preferably extend beyond the surface of the drum 12 in order to maintain the cable assembly 20 around the drum, thus preventing the cable assembly 20 from being removed in any way other than unwinding. In alternative embodiments, additional flanges may be used to compartmentalize the surface of the drum 12. For example, it may be desirable to store the cable portion of the cable assembly 20, around one portion of the drum 12 while leaving another portion of the drum uncovered to allow access to at least one interior compartment of the reel. Flanges may have slots defined therein for allowing distribution cables and drop cables to pass therethrough. The reel 10 may optionally include a brake 100 for slowing or speeding the turning of the reel about an axle (not shown). The brake 100 operates by interfering with the axle. The brake may include, but is not limited to, a strap, belt, chain or like device. The brake 100 may be held in place on a flange 16 of the reel using at least one fastener 102. The fasteners 102 may further function adjust and hold tension applied to the brake 100. The brake 100 may further include at least one handle 104 for pulling. The brake 100 and fasteners 102 preferably have a low-profile so as not to interfere with an adjacent reel 100.

Referring to FIG. 2, the generally tubular configuration of the reel drum 12 defines at least one interior cavity compartment 22 operable for housing hardware attached to the cable assembly 20, such as at least one multi-port connection terminal 32 or the like. In addition, excess drop cable lengths may be stored within the at least one interior cavity 22. The use of the interior cavity 22 for storage of the hardware provides protection of the attached hardware during winding, storage, shipping and deployment. In one embodiment, the reel drum 12 is flexible and collapsible, and in some embodiments segmented, thereby permitting the drum 12 to be compressed to a substantially flat configuration when the reel is disassembled. This feature is particularly advantageous in that the disassembled components of the cable reel 10 may be shipped or stored in flat form.

In exemplary embodiments, the drum 12 is further provided with at least one access panel 26 operable for providing access to the at least one interior cavity 22 of the drum 12 without having to remove either the first or second flange 14, 16. Upon accessing the interior cavity 22, hardware attached to the cable assembly 20, such as multi-port connection terminals, may be stored therein (FIG. 3) and later removed. The access panel 26 includes a channel or cut away portion 28 operable for permitting the attached hardware and a length of drop cable to be conveniently passed to the interior cavity 22. The access panel 26 may be secured in a closed position using any known securing means. As shown, securing means 30a and 30b may be a hook and loop fastener such as VELCRO. As shown in FIG. 3, the multi-port connection terminal 32 is stored in a compartment of the interior cavity 22 with the remainder of the cable assembly 20 being wound upon an exterior surface of the drum 12. Multi-port connection terminals may be stored within compartments arranged substantially perpendicular, tangential or at any other angle relative to the outer surface of the reel.

Figure 4:
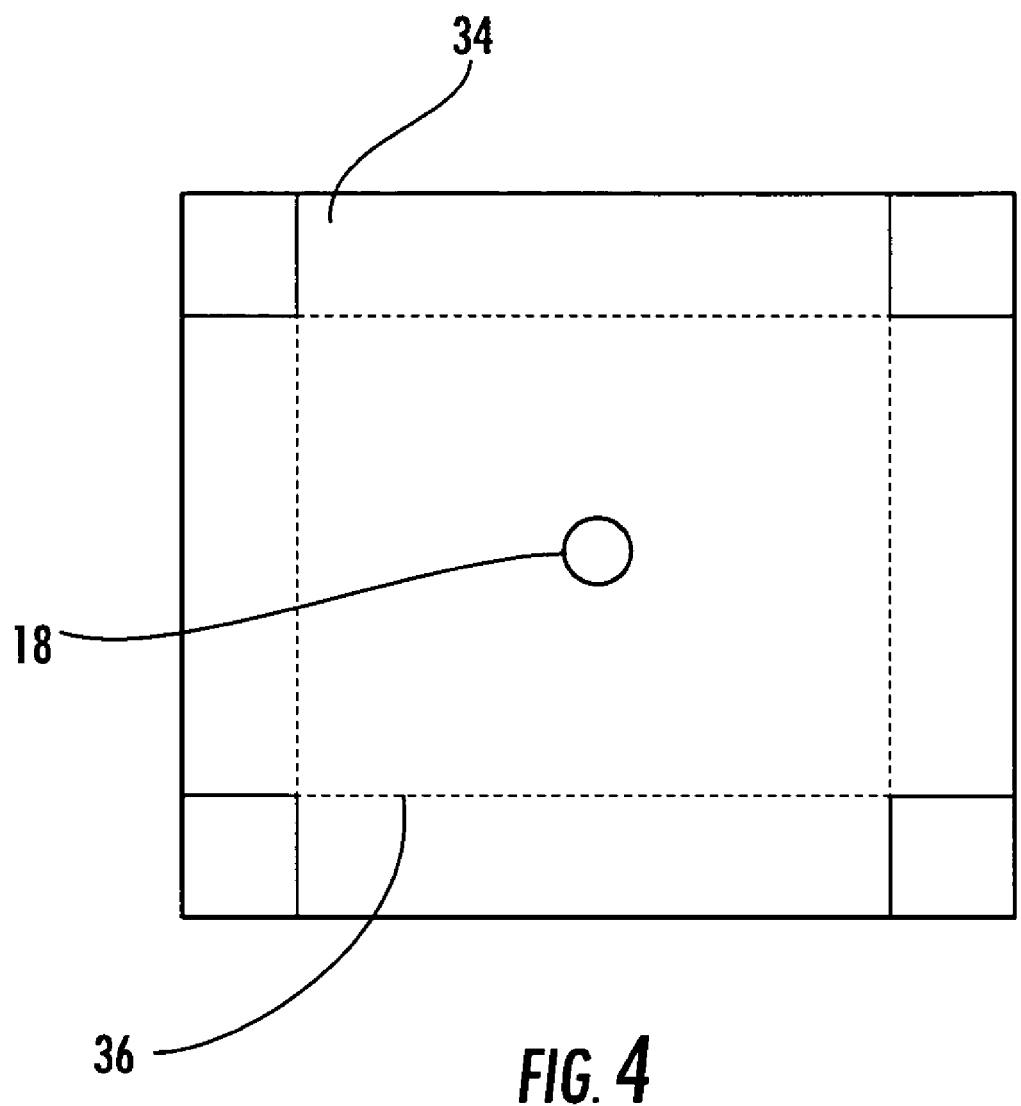
FIG. 4 is a plan view of an exemplary embodiment of an alternative flange operable for use with the cable reel of the present invention.

Referring to FIG. 4, in alternative embodiments, a flange 34 may have other shapes, such as square or rectangular. In such cases, the flange 34 may define perforations 36 such that edges of the flange can be readily folded over to form an enclosed structure about the wound cable, thus providing additional protection to the cable assembly from environmental influences during shipment and eliminates the need for additional shipping packages.

In operation, the cable assembly 20 is mounted upon the cable reel 10 by inserting an axle 24 though the aperture 18 of the first flange 14, through the interior cavity 22 and out of the aperture 18 of the second flange 16. A first leading end (not shown) of the cable assembly 20 is secured to the drum 12 of the cable reel 10 by a securing means, such as tape. The remaining portion of the cable assembly 20 is wound upon the drum 12 by rotating the reel about the axle 24. As the cable assembly is wound and an attached connection terminal is encountered, the terminal, and in some cases a portion of the respective drop cable, is routed through an opening of the drum to the interior cavity. The interior cavity may define compartments having specific structures for securely maintaining connection terminals. Multiple openings in the drum may be used to store multiple connection terminals. In one embodiment, the connection terminals may all be stored together within the interior cavity. As stated above, flanges may separate drum surfaces and provide for separate cable maintenance and connection terminal maintenance. Access flaps and drum openings are designed such that a length of wrapped cable does not block access to the interior cavity. The last wound end of cable assembly is also preferably secured to the reel to prevent unintentional cable assembly unwinding. In another method of use, the cable assembly including attached tether cables may be wrapped upon the reel 10 and multi-port terminals added after some or all of the cable assembly is loaded. The multi-ports may be spliced onto ends of their respective tethers. This allows the tether cables to more easily pass through the access panel 26 because the multi-ports are not attached until after winding.

The embodiments described above provide advantages over conventional fiber optic cable reels. For example, conventional reels do not provide for storage of attached hardware separate from the cable itself. Further, the collapsible feature of the cable reel of the present invention results in a smaller package when not in use. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A reel for maintaining a fiber optic cable assembly including at least one connection terminal, comprising
    a drum defining an exterior surface for receiving a length of wound cable and including at least one access panel therein for providing access to an interior cavity;
    a first flange removably secured to a first end of the drum, the first flange having a substantially centrally located aperture therein for receiving an axle therethrough; and
    a second flange removably secured to a second end of the drum, the second flange having a substantially centrally located aperture therein for receiving the axle therethrough;
    wherein the reel has at least one cable of the fiber optic cable assembly around the exterior surface of the reel and the interior cavity is used to maintain the at least one connection terminal of the cable assembly within, wherein the at least one connection terminal is a multi-port having a plurality of discrete ports, and the first and second flanges are substantially rectangular in shape and define folding edges for folding over and substantially enclosing a wound cable assembly.

2. A reel as recited in claim 1, wherein the drum is collapsible such that it may be collapsed to a substantially flat configuration and is suitable for reuse.

3. A reel as recited in claim 1, wherein the at least one access panel is an opening through the exterior surface of the drum.

4. A reel as recited in claim 1, wherein the interior cavity includes at least one compartment for maintaining the at least one connection terminal of the cable assembly.

5. A reel as recited in claim 1, further comprising a brake.

6. A reel as recited in claim 1, wherein the reel is formed from a polymeric material.

7. A collapsible cable reel for maintaining a fiber optic cable assembly, comprising:
    a collapsible drum defining an exterior surface for receiving a length of wound cable and defining at least one opening therethrough for providing access to an interior cavity of the drum; and
    at least one flange removably attached to the drum and defining an opening therethrough for receiving an axle;
    wherein the reel has a length of at least one fiber optic cable of the fiber optic cable assembly wound around the exterior surface and the interior cavity is used to receive at least one connection terminal attached and optically connected to the at least one fiber optic cable, wherein the at least one connection terminal is a multiport having a plurality of discrete ports; and
    wherein the at least one fiber optic cable and the at least one connection terminal are maintained separately and the at least one flange is substantially rectangular in shape and defines folding edges for folding over and substantially enclosing a wound cable assembly.

8. A reel as recited in claim 7, wherein the drum is collapsible such that it may be collapsed to a substantially flat configuration and is suitable for reuse.

9. A reel as recited in claim 7, wherein the opening is an access panel.

10. A reel as recited in claim 7, wherein the interior cavity includes structure for securely maintaining the at least one connection terminal.

11. A reel as recited in claim 7, further comprising a brake.

12. A reel as recited in claim 7, wherein the reel is formed from a polymeric material.

* * * * *